(12) United States Patent
La Mura

(10) Patent No.: US 7,577,584 B2
(45) Date of Patent: Aug. 18, 2009

(54) DOUBLE AUCTIONS WITH BARGAINING

(76) Inventor: Pierfrancesco La Mura, Via Malcanqi 210, 70059 Trani (BA) (IT)

( * ) Notice: Subject to any disclaimer, the term of this patent is extended or adjusted under 35 U.S.C. 154(b) by 1080 days.

(21) Appl. No.: 10/638,287

(22) Filed: Aug. 11, 2003

(65) Prior Publication Data

US 2005/0038728 A1    Feb. 17, 2005

(51) Int. Cl.
    *G06Q 30/00*    (2006.01)
(52) U.S. Cl. .......................... 705/26; 705/37
(58) Field of Classification Search ............ 705/26, 705/37
    See application file for complete search history.

(56) References Cited

U.S. PATENT DOCUMENTS

2001/0034696 A1*  10/2001  McIntyre ............... 705/37
2002/0147675 A1*  10/2002  Das et al. ............... 705/37

OTHER PUBLICATIONS

Definition of Double Auction, Wikipedia, downloaded frm the Internet on Jan. 18, 2009, two pages.*
Online reverse auctions: Issues, themes, and prospects for the future Sandy D Jap. Academy of Marketing Science, Journal. Greenvale: Fall 2002. vol. 30, Iss. 4; p. 506, downloaded from ProQuest Direct on the Internet on Jun. 16, 2009, 30 pages.*

* cited by examiner

*Primary Examiner*—James Zurita
(74) *Attorney, Agent, or Firm*—Lumen Patent Firm

(57) ABSTRACT

Methods for double auctions that permit bargaining between buyers and sellers as part of the price determination process may be implemented using a computer network connecting the buyers and sellers to a central market system. The central market computer system receives bids, determines matches between the buyers and sellers, and computes a price range for each of the matches. The matches and price ranges are communicated to the buyers and sellers, permitting matching sellers and buyers to bargain on a final price.

7 Claims, 9 Drawing Sheets

Properties for sale

|  | A | B | C | D | E |
|---|---|---|---|---|---|
| S1 | 94 |  |  |  |  |
| S2 |  | 803 |  |  |  |
| S3 |  |  | 222 |  |  |
| S4 |  |  |  | 782 |  |
| S5 |  |  |  |  | 259 |
| B1 | 375 | 709 | 443 | 529 | 407 |
| B2 | 202 | 860 | 636 | 392 | 355 |
| B3 | 206 | 209 | 267 | 166 | 933 |
| B4 | 407 | 644 | 906 | 247 | 200 |
| B5 | 353 | 7 | 118 | 991 | 993 |

Rows S1–S5: Sellers. Rows B1–B5: Buyers.

Figure 7

|  | Properties for sale | | | | | Seller's Price |
|---|---|---|---|---|---|---|
|  | A | B | C | D | E |  |
| S1 | 94 |  |  |  |  | 145 |
| S2 |  | 803 |  |  |  | 803 |
| S3 |  |  | 222 |  |  | 579 |
| S4 |  |  |  | 782 |  | 782 |
| S5 |  |  |  |  | 259 | 784 |
| B1 | 375 | 709 | 443 | 529 | 407 |  |
| B2 | 202 | 860 | 636 | 392 | 355 |  |
| B3 | 206 | 209 | 267 | 166 | 933 |  |
| B4 | 407 | 644 | 906 | 247 | 200 |  |
| B5 | 353 | 7 | 118 | 991 | 993 |  |
| Buyer's Price | 293 | 860 | 636 | 931 | 933 |  |

Total gains from trade: $1905

Figure 8

Properties for sale

|  | A | B | C | D | E |
|---|---|---|---|---|---|
| S1 | 94 |  |  |  |  |
| S2 |  | 803 |  |  |  |
| S3 |  |  | 222 |  |  |
| S4 |  |  |  | 782 |  |
| S5 |  |  |  |  | 259 |
| B1 | 375 | 709 | 443 | 529 | 407 |
| B2 | 202 | 860 | 636 | 392 | 355 |
| B3 | 206 | 209 | 267 | 166 | 933 |
| B4 | 407 | 644 | 906 | 247 | 200 |
| B5 | 353 | 7 | 118 | 991 | 993 |

Sellers / Buyers

Total gains from trade: $1461

Figure 9

DOUBLE AUCTIONS WITH BARGAINING

CROSS-REFERENCE TO RELATED APPLICATIONS

This application claims priority from U.S. provisional application No. 60/402,036 filed Aug. 7, 2002, which is incorporated by reference.

FIELD OF THE INVENTION

The present invention relates generally to computer-implemented market mechanisms. More particularly, the present invention relates to computer-implemented double auction systems that provide price ranges for bargaining.

BACKGROUND OF THE INVENTION

Auctions are defined to be market mechanisms in which several potential buyers or sellers negotiate for the transaction of some item or plurality of items (e.g., "goods" or "properties" or "services") by competitive bidding. Auctions that are conducted or implemented with the assistance of computer-based technology are called electronic auctions or computer implemented auctions. For example, an electronic auction may use computers at the central market system to perform computations associated with the allocation of goods, and electronic auctions may use computer networks to communicate bids and other information between buyers, sellers, and the central market system.

A regular auction is defined as an auction in which there is just one prospective seller who initiates the auction and several prospective buyers who place bids, while a reverse auction is defined as an auction in which there is just one prospective buyer who initiates the auction and several prospective sellers who place bids. Auctions can be dynamic (e.g., the classical English auction) or static (e.g., the second-price auction and its generalizations). Optimal auction mechanisms are those that produce economically optimal allocations, e.g., those which maximize the total gains from trade. Generalized second-price auctions are optimal in a broad range of cases.

Double auctions are defined as auctions with multiple buyers and multiple sellers. A regular double auction is defined as a double auction in which the sellers initiate the process by revealing their intention to sell, after which all the participants (buyers and sellers) submit their bids to a central market system; a reverse double auction is defined to be a double auction in which the buyers initiate the process by expressing their willingness to buy, after which all the participants submit their bids. The bids submitted by sellers are commonly called 'asks'.

Compared to the more common auctions, in which there is just one seller and multiple buyers or just one buyer and multiple sellers, very little is known about double auctions, where there are both multiple buyers and multiple sellers. Even in simple cases, full efficiency is precluded unless the market house is allowed to run budget deficits. Most work on double auctions assumes that the good being traded is homogeneous, i.e., consisting of multiple units of the same type of good, and that buyers and sellers are interested in trading at most one unit of the good.

An economic mechanism, either auction or double auction mechanism, is direct if the best strategy for all participants is to reveal their own true preferences and information to the system. A mechanism is efficient if it produces an economically efficient allocation, i.e., one which exhausts all the potential gains from trade. The gains from trade are measured by the difference between the total monetary value of the final allocation (i.e., the sum of monetary values of all the goods for the participants who receive them in the final allocation) minus the total monetary value of the initial allocation (i.e., the sum of monetary values of all the goods for the participants who hold them in the initial allocation). A mechanism is asymptotically efficient if it approaches full efficiency as the number of buyers and sellers becomes large. A mechanism is individually rational if the buyers and sellers are left free to decide whether to participate or not. A mechanism is budget-balanced if it never incurs losses or gains.

Current double auction mechanisms determine both matches and transaction prices. The prices can be the same for both buyers and sellers, or different. If the prices are different, the market house incurs profits or losses. In current double auction mechanisms the prices faced by buyers and sellers are always final. Furthermore, the prices are always revealed symmetrically to all buyers and sellers, and there is no role for asymmetric price revelation. Furthermore, in existing double auction mechanisms there is no role for bargaining. Due to the above limitations in current double auction mechanisms, it is generally impossible to achieve an efficient allocation of the items which exhausts all the gains from trade among the market participants in any current electronic double auction mechanism which is individually rational and budget-balanced. Accordingly, there is a need for a novel family of electronic double auction mechanisms that overcome the above limitations.

SUMMARY OF THE INVENTION

The present invention provides a novel family of mechanisms and methods that include bargaining between buyers and sellers as part of the price determination process in electronic double auctions. In the present invention, matches between buyers and sellers are determined, together with price ranges whereby bounds are (symmetrically or asymmetrically) revealed to buyers and sellers, after which both buyers and sellers are invited to bargain in order to determine the final prices.

In one aspect of the invention, a method for implementing market transactions among a plurality of buyers and sellers may be implemented using a computer network connecting the buyers and sellers to a central market system. Buyers and sellers send bids over the network to a central market computer system where the bids are processed by a computer. The results of the processing are communicated from the central market computer system to the buyers and sellers using the computer network. The central market computer system determines matches between the buyers and sellers, and a price range for each of the matches. These matches and price ranges are also communicated from the central market computer system to the buyers and sellers using the computer network. Each buyer and seller bargains with a matching seller and buyer on a final price for a transaction based on the communicated price ranges. In some embodiments, sending the bids, processing the bids, and communicating some of the results of the processing may be iterated before a final transaction.

The results and matches may be communicated symmetrically (i.e., buyers and matching sellers receive the same information) or asymmetrically (i.e., buyers and matching sellers receive different information). For example a lower bound of the price range (i.e., the minimum price within the price range) may be communicated to the sellers while an upper bound of the price range (i.e., the maximum price within the price range) may be communicated to the buyers.

In one embodiment, the processing of the bids may include computing a total monetary value of a given allocation of goods to participants, determining an allocation which maximizes the total monetary value, computing the difference of total monetary value for all other participants when a given participant is excluded or included, and setting some of the sellers' bids to a value higher than all of the buyers' bids. In addition, determining the price range for each of the matches may include repeating the following steps to find new buyers' prices: computing the price for each good to be the difference of total monetary value for all other participants when a matching buyer is excluded or included, setting a seller's bid to a value higher than all of the buyers' bids whenever it coincides with the seller's price for the same good, and computing a new allocation which maximizes the total monetary value.

Although the present invention is described below according to some specific examples of double auction mechanisms with bargaining, the present invention provides methods and mechanisms to the whole family of double auctions that involve bargaining as part of the price determination process.

DESCRIPTION OF THE DRAWINGS

FIG. 2 shows reservation prices of buyers and sellers for two goods;

FIG. 3 shows the efficient allocation, i.e., the allocation that maximizes the gains from trade;

FIG. 4 shows the sellers' guaranteed prices (the sellers are advised not to sell for less than those prices);

FIG. 5 shows the seller's reservation price for good 2 being increased to a value higher than the two buyers' reservation prices in order to find the buyers' guaranteed prices (the buyers are advised not to buy for more than those prices); and FIG. 6 shows the resulting bargaining ranges for the two goods.

FIGS. 7-9 compare the performance of the preferred embodiment of the double auction mechanism of the present invention described in Example 2 below with the performance of a sequence of standard English auctions, in the context of a numerical example. The following briefly describes FIGS. 7-9:

FIG. 7 shows the reservation prices of five buyers (B1-B5) and five sellers (S1-S5) for five goods (A-E);

FIG. 8 shows the efficient allocation, i.e., the allocation that maximizes the gains from trade, and the sellers' and buyers' guaranteed prices, according to an embodiment of the present invention; and FIG. 9 shows the allocation and gains from trade generated by a sequence of English auctions.

DESCRIPTION OF THE PREFERRED EMBODIMENTS

In one preferred embodiment of the present invention, a double auction mechanism is provided which has the following properties:

The double auction mechanism deals with heterogeneous goods.

The double auction mechanism includes unit demands and supplies.

The double auction mechanism is budget-balanced.

The double auction mechanism is individually rational.

The double auction mechanism is direct.

The double auction mechanism is asymptotically efficient.

The double auction mechanism includes bargaining in the price determination process between buyers and sellers.

Furthermore, in this embodiment of the double auction mechanism, the method always recommends the efficient matches. Any resulting inefficiency is confined to potential delays in bargaining, whenever buyers and sellers are matched but the mechanism does not determine all the final prices.

The following examples provide illustrations of the method of this embodiment in the context of a real estate market. As a skilled artisan to whom the present invention pertains will readily appreciate, the method is not limited to real estate markets and could be applied to any market.

EXAMPLE 1

Figure 10:
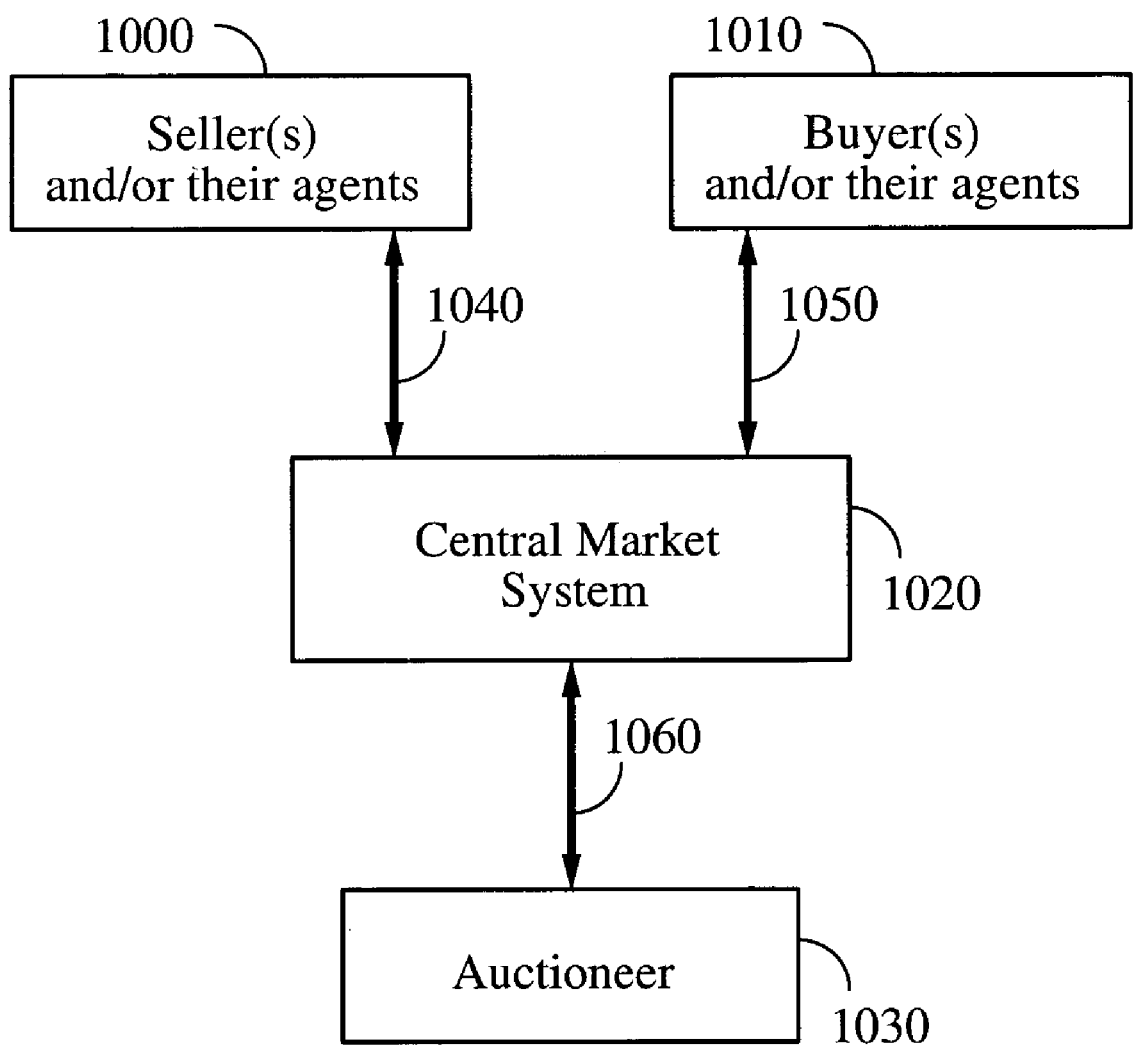
FIG. 10 shows sellers and buyers connected to a central market system using a computer network according to an embodiment of the present invention.

In this example it is assumed for simplicity of illustration only that each buyer and seller is interested in transacting at most one property. All buyers and sellers have access to a central market computer system where the bids are confidentially recorded and processed. For example, FIG. 10 shows sellers 1000 and buyers 1010 communicating with central market system 1020 via computer network links 1040 and 1050, respectively. In addition, an auctioneer (e.g., realtor) 1030 may also communicate with the central market system 1020 via a network link 1060.

Figure 1:
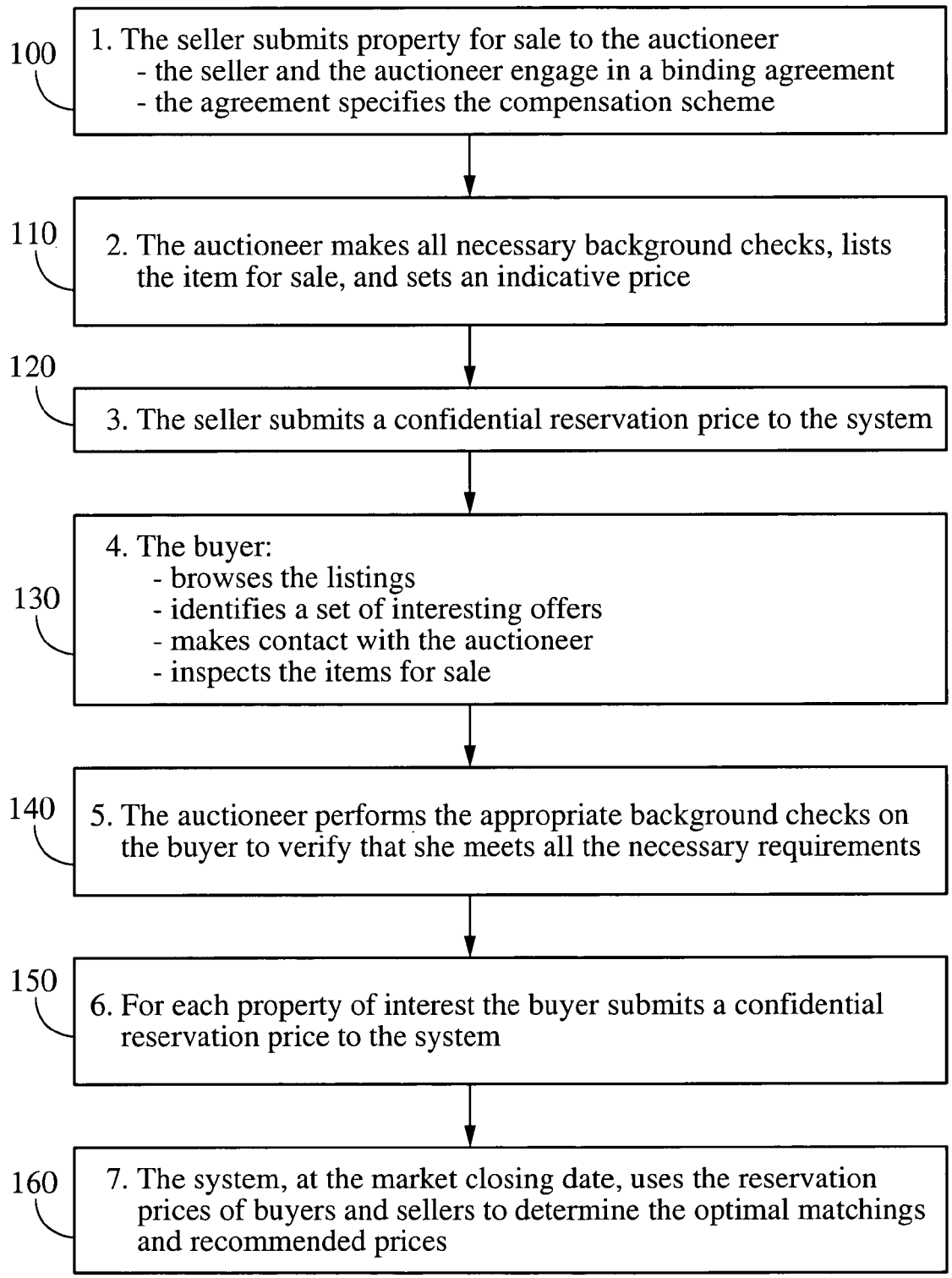
FIG. 1 is a flow chart illustrating a preferred embodiment of the present invention as realized in Example 1.

The following steps outline stages of a real estate market transaction that illustrates how the present embodiment may be realized in a specific context. These steps will be described in relation to the more generic steps of FIG. 1.

1. The seller submits a property for sale to the realtor. (Step 100.)

The seller and the realtor engage in a binding agreement.

The agreement specifies a compensation scheme for the realtor.

2. The realtor appraises the property, makes all the necessary background checks and lists it, together with an indicative price set by the seller. The indicative price reflects the historical prices of similar properties, the conditions of the market, and the experience of the realtor. (Step 110.)

3. The seller submits a confidential reservation price to a central market computer system over the computer network. (Step 120.)

The seller's reservation price may be higher or lower than the indicative price.

The seller may freely change the reservation price until the market closing date.

The reservation price is completely confidential: not even the realtor knows it.

Alternatively, the realtor agrees with the seller to submit the reservation price on his behalf and commits to keeping it confidential.

4. The buyer browses the listings, identifies a set of interesting offers, makes contact with the realtor and inspects the properties. (Step 130.)

The realtor performs the appropriate background checks on the buyer to verify that she meets all the necessary requirements established by the law and by the seller.

Buyer and seller normally do not discuss prices, unless they prefer to transact privately before the market closing date.

5. The realtor performs the appropriate background checks on the buyer to verify that she meets all the necessary requirements. (Step 140.)

6. For each property of interest, the buyer submits a confidential reservation price to the central market computer system over the computer network. (Step 150.)

The buyer's reservation price may be higher or lower than the indicative price.

The buyer may freely change the reservation price until the market closing date.

The reservation price is completely confidential: not even the realtor knows it.

Alternatively, the buyer's realtor agrees with the buyer to submit the reservation price on her behalf and commits to keeping it confidential.

7. The central market computer system, at the market closing date, uses the reservation prices of buyers and sellers to determine the optimal matches between buyers and sellers and recommended sale prices for the goods according to the method described in Example 2 below. This information is then communicated to the buyers and sellers using the computer network. (Step 160.)

Information on the reservation price submitted by a participant (buyer or seller) is used exclusively in the participant's interest: hence, sincerity is the best policy.

Given the recommended prices, the system always recommends the best matching for each participant.

The same property can be on multiple markets with different periodicities (e.g., weekly, monthly, quarterly).

In some cases (in particular, when for a certain property there is only one interested buyer), the method only determines a matching and a price range, but not a final price.

In those cases, the bounds of the price range may be asymmetrically revealed to buyers and sellers (the buyers learn the upper bound, and the sellers the lower bound).

Not recommending a final price preserves the confidentiality of the seller's reservation price.

Matching buyers and sellers are invited to negotiate a final price (bargain) privately.

The buyer does not know the seller's reservation price, but knows that no other property on the market is a better deal for her.

EXAMPLE 2

Figure 11:
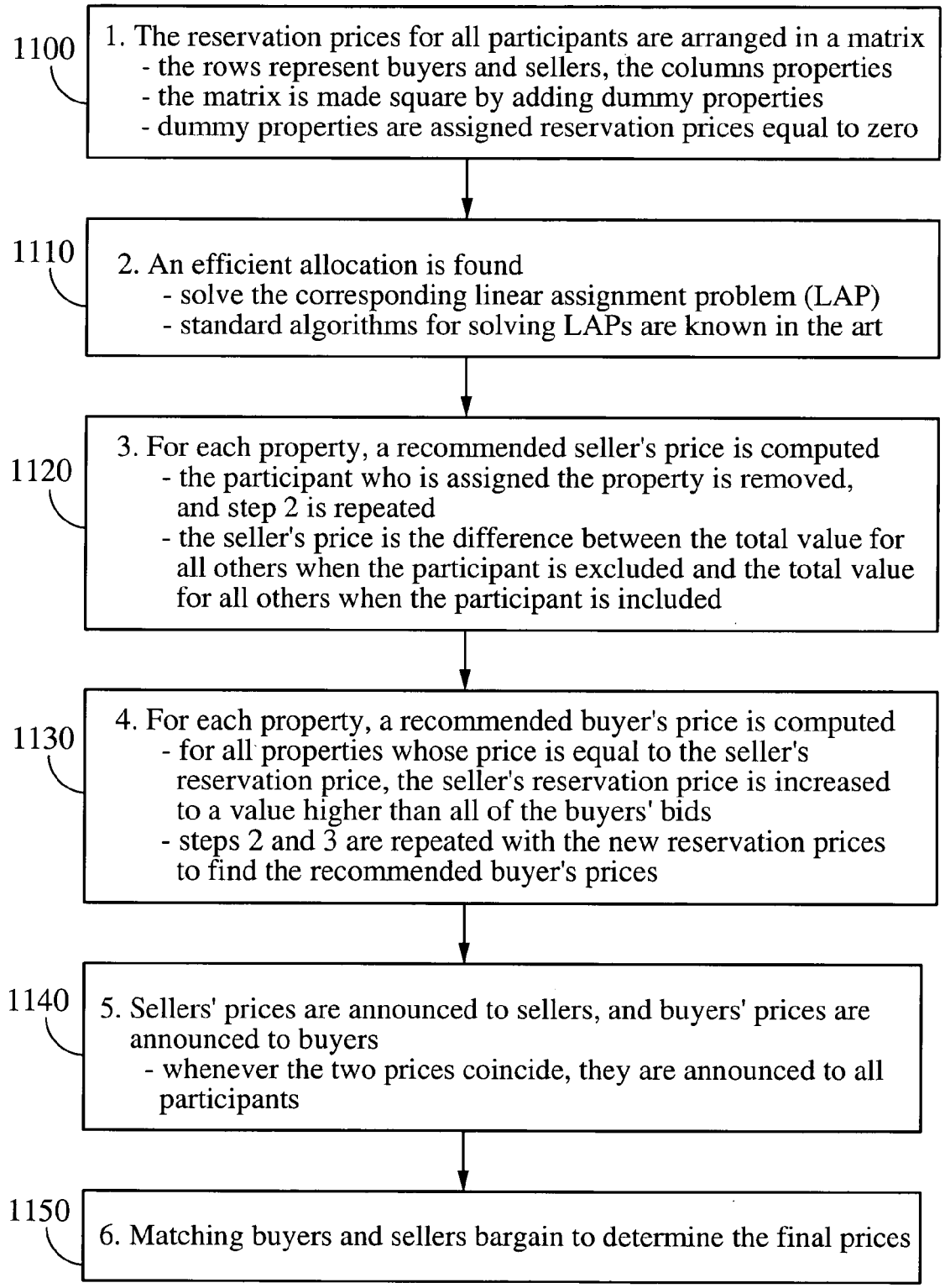
FIG. 11 is a flow chart illustrating a preferred embodiment of the present invention as realized in Example 2.

The example described below provides some more technical information of the methods used in this embodiment. At the market closing date, after the sellers and buyers submit their bids to the central market computer system, the system performs the following steps, as outlined in FIG. 11.

1. The reservation prices for all participants are arranged in a matrix. (Step 1100)

The rows represent buyers and sellers, and the columns properties. For example, FIGS. 7, 8, 9 show matrices wherein rows S1, . . . , S5 represent sellers, rows B1, . . . , B5 represent buyers, and columns A, B, C, D, E represent properties or goods for sale.

The matrix is made square by adding dummy properties (one for each buyer). For example, the matrices in FIGS. 7, 8, 9 may be made square by adding five columns representing five dummy goods.

The cells in the matrix represent reservation prices of participants for properties.

Dummy properties are assigned reservation prices equal to zero.

The only nonzero entry in a seller's row is the reservation price for that seller's own property.

2. An appropriate computation is performed on the matrix to solve the underlying linear assignment problem and find an efficient allocation of the properties. (Step 1110)

many appropriate methods, which are capable of solving a linear assignment problem in polynomial time (including Kuhn's algorithm, or matching algorithms for weighted bipartite graphs, or linear programming algorithms) are known in the literature.

The output is a vector of optimal matches, with dimension equal to the number of goods, whose j-th entry indicates which participant gets good j.

The total value (i.e., the sum of values, as given by the bids, of all the goods for the participants who receive them) of the efficient allocation is also computed 3. For each property, a recommended seller's price is computed. (Step 1120)

To compute the price, step 2 is repeated without the participant who has been matched to that property and without one of the dummy properties (if the participant has been assigned a dummy property, the price is zero).

The price is equal to the difference between the total value for all others when the participant is excluded, and the total value for all others when the participant is included.

4. For each property, a recommended buyer's price is computed. (Step 1130)

For all properties whose price is equal the seller's reservation price, the seller's reservation price is increased to a value higher than all of the buyers' bids.

Steps 2 and 3 are repeated with the new reservation prices to find the recommended buyer's prices.

5. Sellers' prices are announced to all sellers, and buyers' prices to all buyers. (Step 1140) Alternatively, the seller's price for each property is announced only to the seller of that property (but not to the other sellers) and the buyer's price only to the matching buyer (but not to the other buyers). Whenever the two prices coincide, they are announced to all participants. The matches are also announced, and for each property the corresponding buyer and seller are invited to negotiate on the final price.

Sellers are advised not to sell for less than their recommended price, and buyers not to buy for more than their recommended price.

6. Matching buyers and sellers are invited to bargain to determine final prices, and the system may be used to facilitate the bargaining process. (Step 1150)

If the negotiations take place only through the system (e.g., by means of user IDs instead of real identities) both the buyer and the seller can make a 'final offer' to the counterpart. If they do so, and the offer is not accepted, the system does not allow further communication between buyer and seller.

Figure 2:
FIGS. 2-6 graphically illustrate the method of the present invention in a preferred embodiment as applied to Example 2. The following briefly describes FIGS. 2-6.
Figure 3:
Figure 4:
Figure 5:
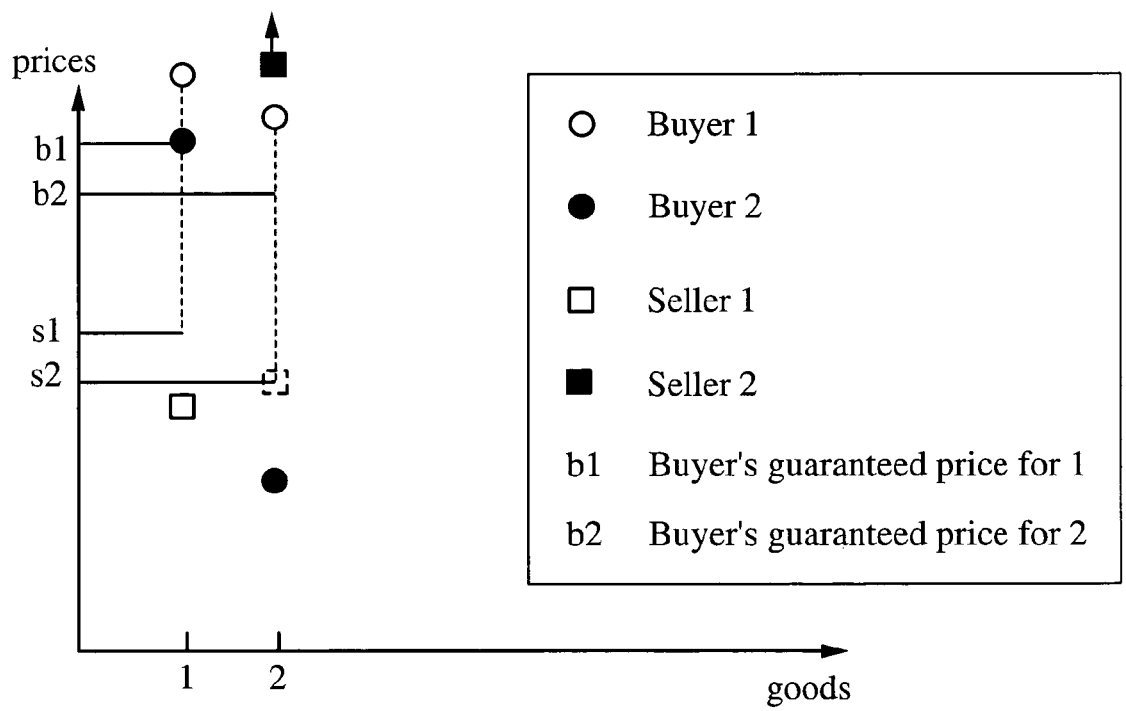
Figure 6:
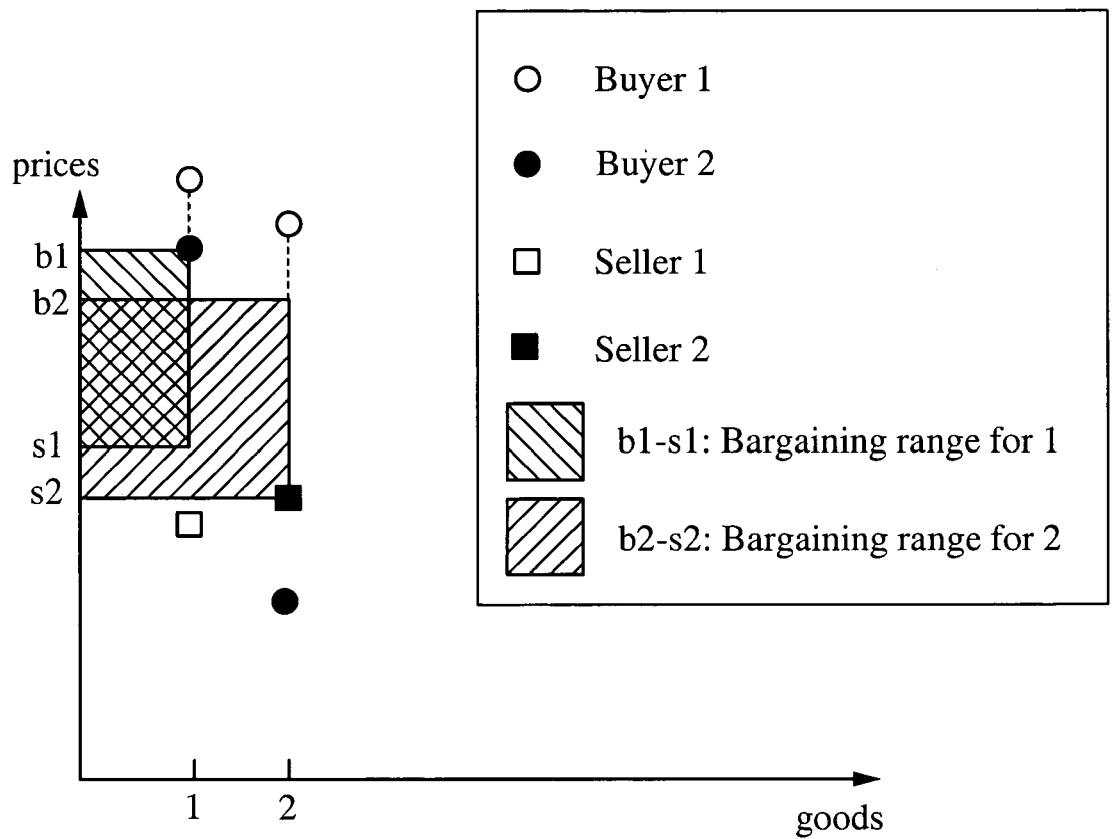

This example may be further illustrated with reference to FIGS. 2-6 which are graphs illustrating a particular case where there are two buyers, two sellers, and two goods. FIG. 2 is a graph of reservation prices of the buyers and sellers for two goods. Note that seller 1 has a reservation price for good 1, but not for good 2. Similarly, seller 2 has a reservation price for good 2, but not for good 1. The buyers have reservation prices for both goods. FIG. 3 shows the efficient allocation of the goods, i.e., the allocation that maximizes the gains from trade. In particular, good 1 is allocated to buyer 2 and good 2 is allocated to buyer 1. In other words, seller 1 is matched to buyer 2 and seller 2 is matched to buyer 1. FIG. 4 shows the sellers' guaranteed prices s1 and s2. These are the lowest prices at which the sellers are advised to sell. FIG. 5 shows the seller's reservation price for good 2 being increased to a value higher than the buyers' reservation prices in order to find the buyers' guaranteed prices b1 and b2. These are the highest prices at which the buyers are advised to buy. FIG. 6 shows the resulting bargaining ranges for the two goods. Good 1 has a bargaining range from s1 to b1, while good 2 has a bargaining range from s2 to b2.

The performance of the preferred embodiment of the double auction mechanism of the present invention described in Example 2 above may be illustrated by comparing it with the performance of a sequence of standard English auctions. FIGS. 7-9 make such a comparison in the context of a specific numerical example. FIG. 7 shows the reservation prices of five buyers (B1-B5) and five sellers (S1-S5) for five goods (A-E). FIG. 8 shows the efficient allocation, i.e., the allocation that maximizes the gains from trade, and the sellers' and buyers' guaranteed prices, according to an embodiment of the present invention. The method applied to this case allocates good A to buyer B1, good B to buyer B2, C to B4, D to B5, and E to B3. The sellers' prices and buyers' prices are shown. The total gains from trade in this case is $1905. In contrast, FIG. 9 shows the allocation of the same goods as determined by a sequence of English auctions. In this case, the bidders are myopic. Good A is sold to buyer B4 for $375, good B is unsold (the seller's reservation price is not met), good C is sold to buyer B2 for $443, good D is unsold (the seller's reservation price is not met), and good E is sold to B5 for $933. The total gains from trade in this case is $1461, almost 25% less than the total gains using the methods of the invention.

The above examples describe the method steps of a preferred embodiment of the present invention, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention. The following describes two alternate embodiments of the present invention.

Variant 1:

In another embodiment of the present invention, sellers can buy. The method is similar to the methods described above with reference to example 1 and 2, but now sellers can also buy.

Such a method has an additional step:
Step 0:
Sellers also browse listings, and submit reservation prices for other properties.
Sellers only want to buy if they can sell their own property.
Steps 1-5 are analogous to the case described above. Specifically, the reservation prices of all participants are arranged in a matrix, which is made square by adding dummy properties (one for each buyer). Now, contrary to the previous embodiment, it is no longer the case that a seller's entries in the matrix are all zero except for the one corresponding to that seller's good. As in the previous case, an efficient allocation is found by solving the underlying linear assignment problem. For each good, the corresponding seller's price is obtained by excluding the participant who is assigned the good, together with the good that the participant contributed, and computing the difference in the total value for all other participants when that participant is excluded or included. Finally, buyers' prices are obtained by setting the value of a seller's bid to a value higher than the values of all the buyers' bids whenever that seller's bid value coincides with the seller's price for the same good, and again finding an efficient allocation and the corresponding prices. The matches are then announced to all participants, while matching buyers and sellers are privately informed of the maximum and minimum prices only for the goods they are transacting, but not for the other goods. (Note the different asymmetric price revelation rule in this case. Now a seller may also be a buyer, so announcing all of the buyers' prices to all the buyers does not make sense, because some sellers would also learn them insofar as they are also buyers.)

Variant 2:

In yet another embodiment of the present invention, sellers have preferences over buyers. As in the previous embodiment we assume unit demands and supplies, i.e., we assume that each buyer and seller is interested in trading at most one unit, and that the goods are heterogeneous. The method is similar to the methods described above with reference to Examples 1 and 2, but now sellers have preferences (e.g., monetary discounts or premiums) over buyers. This variant includes the following steps:

1. The optimal matches correspond to linear assignments which maximize the total gains from trade.

Two matrices are used. In both matrices, buyers are arranged by rows, sellers by columns.

A first matrix V (buyers, sellers) represents the values for buyers.

A second matrix C (buyers, sellers) represents the cost for sellers.

A number of dummy buyers or sellers (with zero reservation prices for all properties) is introduced to make each matrix square.

The second matrix (i.e., the cost matrix) reflects the monetary discounts and premiums attached by sellers to different buyers.

The matrix $G:=(V-C)+$(the positive part of V-C) represents the gains from trade from each matching. Note that, if an element of V-C is negative, the corresponding element of G is zero.

An optimal matching is found by solving the assignment problem.

2. Sellers' prices are found by computing the difference between buyer out/buyer in gains from trade for all others.

3. If for some good the price is equal to the cost, the seller's reservation price for that good is set to infinity and the steps are repeated.

4. Buyers' prices are found by computing the difference between buyer out/buyer in gains from trade for all others.

5. The sellers' prices are announced to sellers, and the buyers' prices are announced to buyers. For each property, the buyer and seller are then invited to negotiate. The buyer is advised not to buy for more than the buyer's price, and the seller not to sell for less than the seller's price.

What is claimed is:

1. A method for implementing market transactions among a plurality of buyers and sellers, the method comprising:

sending bids from the buyers and sellers to a central market computer system;

processing the bids by the central market computer system; wherein the processing comprises determining by the central market computer system matches between the buyers and sellers, and computing by the central market computer system a price range for each of the matches, wherein the price range comprises a lower bound of the price range and an upper bound of the price range wherein the central market computer system does not compute a final price for a transaction; and communicating results of the processing by the central market computer system to the buyers and sellers; wherein communicating the results comprises communicating by the central market computer system to the buyers and sellers the matches between the buyers and sellers and the price range for each of the matches;

whereby the communicated price ranges for the matches enable matching buyers and sellers to bargain on a final price for a transaction.

2. The method of claim 1 wherein communicating the results comprises sending to both a buyer and a seller for a match a price range lower bound and a price range upper bound.

3. The method of claim 1 wherein communicating the results comprises sending to a buyer for a match a price range upper bound, and sending to a seller for a match a price range lower bound.

4. The method of claim 1 wherein sending the bids, processing the bids and communicating results of the processing are iterated.

5. The method of claim 1 wherein the matches maximize the total gains from trade.

6. The method of claim 1 wherein the processing of the bids comprises:

computing a total monetary value of a given allocation of goods to participants;

determining an allocation which maximizes the total monetary value;

computing the difference between a total monetary value for all other participants when a given participant is excluded and a total monetary value for all other participants when the given participant is included; and re-setting selected bids to a value higher than all of the buyers' bids.

7. A method for implementing market transactions among a plurality of buyers and sellers, the method comprising:

sending bids from the buyers and sellers to a central market computer system;

processing the bids by the central market computer system; wherein the processing comprises determining by the central market computer system matches between the buyers and sellers, and a price range for each of the matches; and communicating results of the processing by the central market computer system to the buyers and sellers;

wherein communicating the results comprises communicating the matches and price ranges by the central market computer system to the buyers and sellers whereby the communicated price ranges for the matches enable matching buyers and sellers to bargain on a final price for a transaction;

wherein the processing of the bids comprises:

computing a total monetary value of a given allocation of goods to participants;

determining an allocation which maximizes the total monetary value;

computing the difference between a total monetary value for all other participants when a given participant is excluded and a total monetary value for all other participants when the given participant is included; and re-setting selected bids to a value higher than all of the buyers' bids wherein determining of the price range for each of the matches comprises:

finding recommended buyers' prices by iteratively:

computing recommended sellers prices for each good to be a difference between a total monetary value for all other participants when a matching buyer is excluded and a total monetary value for all other participants when the matching buyer is included;

setting a seller's bid to a value higher than all of the buyers' bids for all sellers whose bids coincide with the recommended seller's price for the same good; and computing a new allocation which maximizes the total monetary value.

* * * * *

UNITED STATES PATENT AND TRADEMARK OFFICE
CERTIFICATE OF CORRECTION

PATENT NO. : 7,577,584 B2
APPLICATION NO. : 10/638287
DATED : August 18, 2009
INVENTOR(S) : Pierfrancesco La Mura Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1608 days.

Signed and Sealed this

Seventh Day of September, 2010

David J. Kappos
*Director of the United States Patent and Trademark Office*